March 26, 1963 A. E. HEINE ETAL 3,082,452
SCRAPER ATTACHMENT FOR ELECTRIC DRILL
Filed June 20, 1962 2 Sheets-Sheet 1
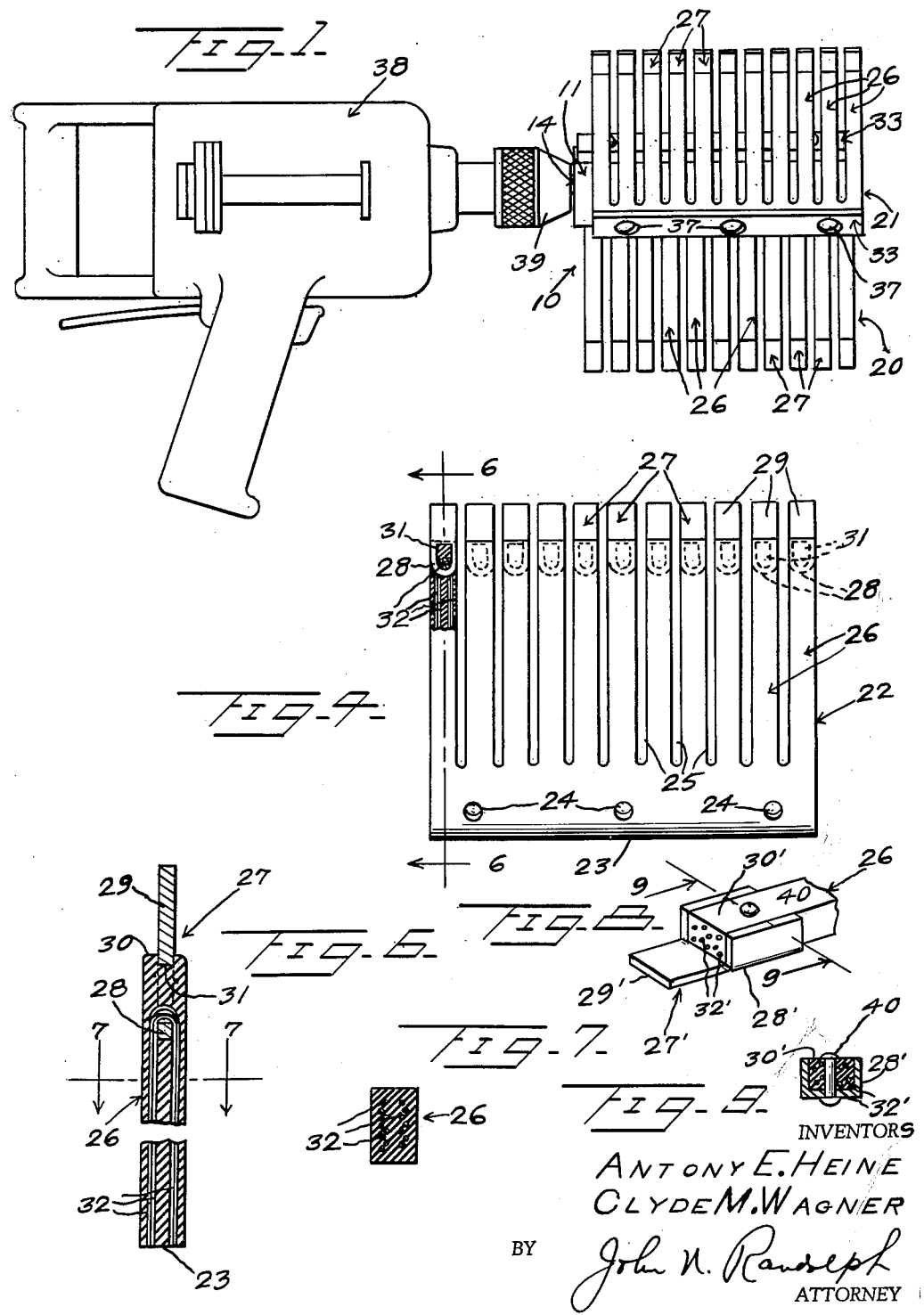
INVENTORS
ANTONY E. HEINE
CLYDE M. WAGNER
BY John N. Randolph
ATTORNEY

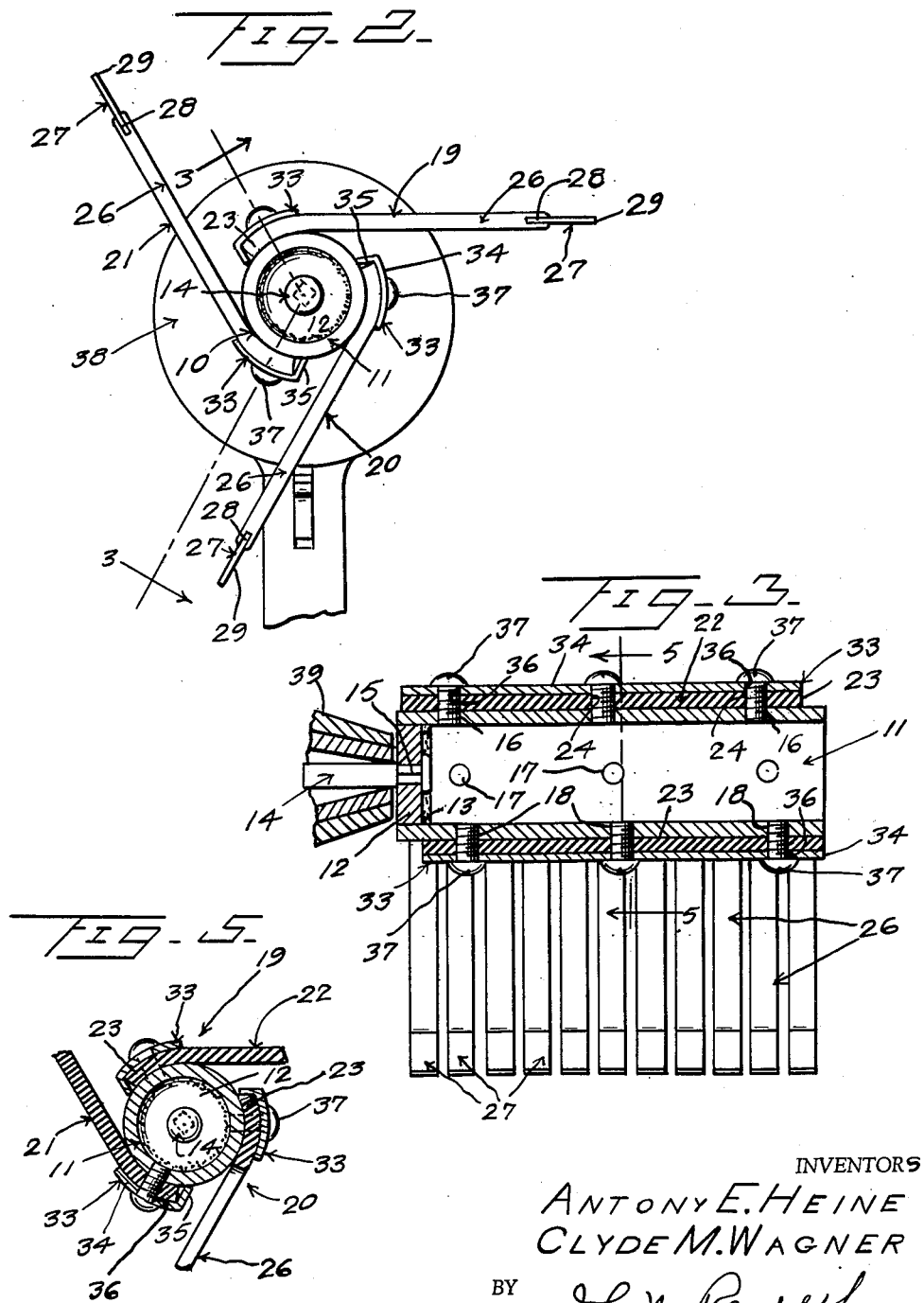

3,082,452
SCRAPER ATTACHMENT FOR ELECTRIC DRILL
Antony E. Heine and Clyde M. Wagner, Steeleville, Ill.
Filed June 20, 1962, Ser. No. 203,939
7 Claims. (Cl. 15—93)

This invention relates to a novel scraping or chipping attachment for portable electric drills and more particularly to such an attachment which may be effectively utilized for scraping, chipping, or otherwise cleaning surfaces of various materials including metals, wood and cement.

Another object of the invention is to provide an attachment capable of functioning effectively for cleaning uneven surfaces.

Still another object of the invention is to provide an attachment of extremely simple construction which may be very economically manufactured and sold, and which will be extremely efficient and durable.

Still a further object of the invention is to provide an attachment wherein the parts thereof, subject to wear, are readily replaceable.

Various other objects and advantages of the invention will hereinafter become more fully apparent from the following description of the drawings, illustrating a presently preferred embodiment thereof, and wherein:

FIGURE 1 is a side elevational view showing the attachment applied to a conventional portable electric drill;

FIGURE 2 is an end elevational view thereof looking toward the outer end of the attachment, from right to left of FIGURE 1, with the hand drill shown partially broken away;

FIGURE 3 is a fragmentary longitudinal sectional view taken substantially along the line 3—3 of FIGURE 2;

FIGURE 4 is a plan view, partly in section, of one element of the attachment;

FIGURE 5 is a fragmentary cross sectional view taken substantially along the line 5—5 of FIGURE 3;

FIGURE 6 is an enlarged fragmentary sectional view, taken substantially along a plane as indicated by the line 6—6 of FIGURE 4;

FIGURE 7 is a fragmentary cross sectional view, taken substantially along a plane as indicated by the line 7—7 of FIGURE 6;

FIGURE 8 is a fragmentary perspective view of a slightly modified form of the attachment, and FIGURE 9 is a cross sectional view thereof, taken substantialy along the line 9—9 of FIGURE 8.

Referring more specifically to the drawings, the scraping or chipping attachment in its entirety and comprising the invention is designated generally 10 and includes an elongated rigid tubular or cylindrical body 11 having a plug 12 immovably secured in an inner end thereof, as by welding, as indicated at 13. A shank or stem 14 projects outwardly from the plug 12 and is disposed axially of the body 11, said shank having a restricted noncircular end portion 15 which is rigidly secured immovably to the plug 12.

The body 11 is provided with three rows of threaded openings 16, 17 and 18, each composed of three longitudinally spaced aligned openings, although a greater or lesser number may be provided. The openings of each row are spaced circumferentially equal distances from the openings of each of the other rows.

The scraping or abrading attachment 10 includes three corresponding scraping members 19, 20 and 21, each of which includes a relatively thick sheet 22 of a flexible material, preferably rubber. The sheet 22 is provided along an inner edge 23 thereof with three openings 24 which are spaced apart a distance corresponding to the spacing between the openings of any one of the rows 16, 17 or 18. The sheet or strip 22 is provided with a plurality of spaced substantially parallel slots 25 which extend from near the inner edge 23 thereof through the other opposite edge of said sheet and which are disposed perpendicular to the inner edge 23, to form a plurality of corresponding fingers 26. As best illustrated in FIGURE 4, the sheet 22, slotted to form the fingers 26, is of comblike construction with said fingers being connected to one another solely by the inner edge portion 23 which is solid except for the openings 24.

Each finger 26 supports a flat steel blade 27 having an inner portion 28 which is molded in the finger 26 thereof, as best seen in FIGURE 6, and an outer portion 29 which projects outwardly from the distal end or tip 30 of said finger. The blade 27 is disposed in the plane of the finger thereof, is preferably of a width substantially corresponding to the width of said finger and of a thickness substantially less than the finger thickness, and with the blade being disposed approximately midway between opposite sides of the finger. The embedded portion 28 of the blade is provided with an opening 31. The sheet 22 is reinforced by a multiplicity of flexible, preferably nonelastic strands, such as nylon strands 32, which extend lengthwise of the fingers 26 and which are turned back upon themselves, intermediate of their ends, so as to pass through the openings 31 to cooperate in anchoring the chipping or scrapping blades to the tip portions of the fingers, said blades and the strands 32 being molded integrally with the sheet 22.

Each scrapping member 19, 20 and 21 also includes an elongated rigid clamping plate or strip, designated generally 33, including a portion 34 which extends from end-to-end thereof and which is transversely bowed, and a longitudinal edge portion 35 which projects at nearly a right angle from the concave inner side of one longitudinal edge of the portion 34, and which likewise extends from end-to-end of the plate 33. The portion 34 is of a width substantially greater than that of the flange 35 and is provided with three longitudinally spaced aligned openings 36, which are spaced apart the same distance as the openings 24.

The inner edge portions 23 of the members 22 are disposed between the periphery of the body 11 and the portions 34 of the clamping plates 33, and longitudinally thereof, with the openings 24 and 36 in alignment with the openings 16, 17 and 18, the openings 24 of each member 22 and the openings 36 of the plate 33 associated therewith, aligning with the openings of one of the rows 16, 17 or 18. Headed screw fastenings 37 extend through the aligned openings 36 and 24 and are secured in the body openings 16, 17 or 18, aligned therewith, for securing the scraping members to the body 11 and with the inner edge portions 23 of the members 22 clamped against the exterior of the body 11. The flanges 35 bear against the body 11, beyond the inner edges 23, to provide fulcrums about which the plates 33 rock as the fastenings 37 are tightened for clamping the plate portions 34 against the portions 23. The members 22 possess sufficient stiffness so that the fingers 26 normally project substantially tangentially from the periphery of the body 11, as illustrated in FIGURE 2.

The scraping or chipping attachment 10 is adapted to be utilized with a conventional portable electric drill 38. The stem 14 is received and clamped in the drill chuck 39 in a conventional manner so that the body 11 projects outwardly from and is disposed in alignment with the drill chuck. The attachment 10 is revolved counterclockwise, as seen in FIGURE 2, when the drill 38 is energized, so that the inner portions 23 travel in advance of the fingers 26 of each member 22. The fingers 26 are sufficiently flexible so that said fingers are urged outwardly toward radial positions relative to the body 11 by centrifugal force when the attachment 10 is revolved. The tips of the steel blades 27 are disposed to strike a surface to be scraped, chipped or abraded, for removing paint, rust or other material therefrom. The staggered arrangement of the rows of openings 16, 17 and 18 stagger the scraping members 19, 20 and 21 relative to one another, as seen in FIGURE 3, so that the fingers of any one of the members 19, 20 or 21 overlap the slots 25 of at least one of the other of said members in order that the attachment can completely clean a surface of a width corresponding to the spacing between the most remote fingers of said attachment. Due to the individual flexibility of the fingers 26, enabling said fingers to yield inwardly toward the body 11 to different degrees during an abrading operation, the attachment 10 readily adapts itself to scraping or chipping uneven or contoured surfaces in addition to flat surfaces. While the attachment 10 is extremely durable, it will be readily obvious that the individual members 22 may be readily replaced, if necessary, by merely removing the three fastenings 37 by which each member is anchored to the body 11.

FIGURES 8 and 9 illustrate a slight modification of the attachment wherein the fingers 26' preferably have the nylon strands 32' thereof only extending lengthwise and not turned back as shown in FIGURE 6. In lieu of the blades 27, each finger 26' has a blade 27' including a channel shaped inner portion 28' in which the distal end 30' of the finger 26' has a snug fitting engagement. The blade portion 29', which extends beyond the distal finger end 30' forms an extension of the bed portion of the channel 28' and is disposed so as to extend from one side of the finger 26', as clearly illustrated in FIGURE 8. A rivet 40 extends perpendicularly through the finger tip 30' and through the bed of the channel 28' for anchoring the blade 27' to the finger 26'. The modified form of the invention as illustrated in FIGURES 8 and 9 is otherwise identical with the attachment 10 as illustrated in FIGURES 1 to 7.

Various other modifications and changes are contemplated and may be resorted to, without departing from the function or scope of the invention as hereinafter defined by the appended claims.

We claim as our invention:

1. A scraping attachment comprising an elongated rigid body having a stem projecting from one end thereof and adapted to be detachably secured in a drill chuck, a plurality of sets of fingers secured to and extending outwardly from said body, each set of fingers being disposed longitudinally of the body, a blade secured to and projecting outwardly from the distal end of each finger, and said fingers being flexible for yieldably supporting said blades relative to the axis of the body.

2. A scraping attachment as in claim 1, and means detachably securing the sets of fingers to said body with the fingers of the different sets disposed in staggered relation relative to one another.

3. A scraping attachment as in claim 1, said fingers being formed of a molded material, said blades having inner portions embedded in said fingers and outer portions projecting beyond the distal ends thereof.

4. A scraping attachment as in claim 3, and flexible nonelastic strands molded in and extending lengthwise of said fingers and engaging through said inner portions of the blades for anchoring the blades to the fingers.

5. A scraping attachment as in claim 1, said body being of circular cross section, each set of fingers being formed from a single sheet of flexible material having an edge portion from which said fingers project and, means detachably clamping said edge portion against a part of the periphery of said body member and longitudinally thereof for positioning said fingers substantially tangentially of a part of said periphery.

6. A scraping attachment as in claim 5, said edge portions being secured to circumferentially spaced portions of the periphery of the body and with the fingers thereof all extending from the body in substantially the same direction relative to said edge portions thereof.

7. A scraping attachment as in claim 1, each of said blades having a channel shaped inner portion embracing the distal end of the finger thereof, and a fastening extending through said inner portion and finger for securing the blade to the finger.

No references cited.